(12) United States Patent
Haj-Maharsi et al.

(10) Patent No.: US 10,734,821 B2
(45) Date of Patent: Aug. 4, 2020

(54) POWER CONTROL SYSTEM

(71) Applicant: Saudi Arabian Oil Company, Dhahran (SA)

(72) Inventors: Mohamed Y. Haj-Maharsi, Dhahran (SA); Abdulaziz A. Altalhi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 191 days.

(21) Appl. No.: 15/915,122

(22) Filed: Mar. 8, 2018

(65) Prior Publication Data

US 2019/0280492 A1 Sep. 12, 2019

(51) Int. Cl.
*H02J 3/00* (2006.01)
*H02J 7/00* (2006.01)
*H02J 9/06* (2006.01)
*H02J 3/32* (2006.01)

(52) U.S. Cl.
CPC .............. *H02J 7/0021* (2013.01); *H02J 3/32* (2013.01); *H02J 9/062* (2013.01)

(58) Field of Classification Search
CPC .............. H02J 9/062; H02J 7/0021; H02J 3/32
See application file for complete search history.

(56) References Cited

U.S. PATENT DOCUMENTS

| | | | |
|---|---|---|---|
| 5,194,803 A | 3/1993 | Visser et al. | |
| 5,514,915 A | 5/1996 | Kim et al. | |
| 5,801,937 A | 9/1998 | Gold et al. | |
| 5,841,355 A | 11/1998 | Bae et al. | |
| 5,889,659 A | 3/1999 | Emmerich | |
| 6,549,440 B2 | 4/2003 | Tassitino, Jr. et al. | |
| 6,577,108 B2 | 6/2003 | Hubert et al. | |
| 6,700,804 B1 | 3/2004 | Reichard | |
| 6,828,507 B1 | 12/2004 | Fritzemeier et al. | |
| 6,981,331 B1 | 1/2006 | Poe, Jr. et al. | |

(Continued)

FOREIGN PATENT DOCUMENTS

| | | |
|---|---|---|
| WO | WO-2002/061910 A2 | 8/2002 |
| WO | WO-2004/054065 A1 | 6/2004 |

(Continued)

OTHER PUBLICATIONS

International Search Report for PCT/IB2018/056516, 4 pages (dated Oct. 23, 2018).

(Continued)

*Primary Examiner* — Alfonso Perez Borroto
*Assistant Examiner* — Esayas G Yeshaw
(74) *Attorney, Agent, or Firm* — Choate, Hall & Stewart LLP; Charles E. Lyon; Alexander D. Augst

(57) ABSTRACT

An example method includes monitoring a state of charge of one or more energy storage devices that are part of an uninterruptable power supply (UPS) that is connected electrically to a power distribution grid; obtaining information that is based, at least in part, on a voltage on the power distribution grid; and outputting a control signal that is based on the state of charge and the information. The control signal is for controlling power electronics either to output voltage from the one or more energy storage devices to the power distribution grid or to charge the one or more energy storage devices using voltage from the power distribution grid.

19 Claims, 3 Drawing Sheets

(56) References Cited

U.S. PATENT DOCUMENTS

| | | |
|---|---|---|
| 7,071,581 B2 | 7/2006 | Eisenhaure et al. |
| 7,091,703 B2 | 8/2006 | Folts et al. |
| 7,106,156 B2 | 9/2006 | Buczek et al. |
| 7,265,521 B2 | 9/2007 | Kehrli et al. |
| 7,286,906 B2 | 10/2007 | Richards |
| 7,345,379 B2 | 3/2008 | Okayama et al. |
| 7,391,132 B2 | 6/2008 | Chen |
| 7,567,160 B2 | 7/2009 | Folts et al. |
| RE41,170 E | 3/2010 | Hubert et al. |
| 7,701,087 B2 | 4/2010 | Eckroad et al. |
| 7,787,272 B2 | 8/2010 | Lasseter et al. |
| 7,940,029 B2 | 5/2011 | Johnson |
| 8,138,635 B2 | 3/2012 | Campbell |
| 8,598,749 B2 | 12/2013 | Lacarnoy |
| 8,670,254 B2 | 3/2014 | Perreault et al. |
| 8,803,361 B2 | 8/2014 | Johansen et al. |
| 9,343,989 B2 | 5/2016 | Baruschka |
| 9,735,616 B2 | 8/2017 | Colombi et al. |
| 9,793,755 B2 | 10/2017 | Garrity et al. |
| 9,806,561 B2 | 10/2017 | Navarro |
| 2002/0079957 A1 | 6/2002 | Hubert |
| 2002/0101119 A1 | 8/2002 | Eisenhaure et al. |
| 2003/0067285 A1 | 4/2003 | Kehrli et al. |
| 2005/0012395 A1 | 1/2005 | Eckroad et al. |
| 2005/0231871 A1 | 10/2005 | Karimi Ghartemani |
| 2008/0088183 A1 | 4/2008 | Eckroad et al. |
| 2008/0278005 A1* | 11/2008 | Chambon ............... H02J 9/005 307/66 |
| 2010/0019776 A1 | 1/2010 | Folts et al. |
| 2013/0123989 A1 | 5/2013 | Krolak et al. |
| 2013/0234521 A1 | 9/2013 | Eom et al. |
| 2013/0264865 A1 | 10/2013 | Sugeno et al. |
| 2014/0062192 A1 | 3/2014 | Vichnyakov |
| 2014/0117756 A1* | 5/2014 | Takahashi ............... H02J 3/383 307/23 |
| 2014/0368042 A1 | 12/2014 | Giuntini et al. |
| 2015/0188409 A1 | 7/2015 | Ohori et al. |
| 2015/0340864 A1 | 11/2015 | Compton |
| 2016/0133959 A1* | 5/2016 | Kwon ................. H01M 8/0488 |
| 2016/0190865 A1 | 6/2016 | Shin et al. |
| 2017/0009845 A1 | 1/2017 | Arseneaux et al. |
| 2017/0256984 A1 | 9/2017 | Ding et al. |

FOREIGN PATENT DOCUMENTS

| | | |
|---|---|---|
| WO | WO-2008/015502 A1 | 2/2008 |
| WO | WO-2012/067368 A2 | 5/2012 |
| WO | WO-2013/152397 A1 | 10/2013 |
| WO | WO-2014/082221 A1 | 6/2014 |
| WO | WO-2016/034086 A1 | 3/2016 |
| WO | WO-2016/123879 A1 | 8/2016 |
| WO | WO-2017/006427 A1 | 1/2017 |
| WO | WO-2017/019740 A1 | 2/2017 |
| WO | WO-2017/148150 A1 | 9/2017 |

OTHER PUBLICATIONS

Written Opinion for PCT/IB2018/056516, 7 pages (dated Oct. 23, 2018).

Written Opinion of the International Preliminary Examining Authority for PCT/IB2018/056516, 6 pages (dated Jan. 22, 2020).

* cited by examiner

POWER CONTROL SYSTEM

TECHNICAL FIELD

This specification describes example power control systems that are configurable to provide voltage to, and to receive voltage from, a power distribution grid.

BACKGROUND

An uninterruptable power supply (UPS) includes a system configured to provide power to a load in cases where a main power supply fails or falters. UPS systems come in different configurations to suit specific power quality needs. Example configurations of a UPS system include a power conversion system and an energy storage system, such as a set of batteries. The batteries store energy in order to power the load when the main power supply fails. In some cases, the main power supply does not fail, or does not fail often, and the energy stored in the batteries is not used.

SUMMARY

An example method includes monitoring a state of charge of one or more energy storage devices that are part of an uninterruptable power supply (UPS) that is connected electrically to a power distribution grid; obtaining information that is based, at least in part, on a voltage on the power distribution grid; and outputting a control signal that is based on the state of charge and the information. The control signal is for controlling power electronics either to output voltage from the one or more energy storage devices to the power distribution grid or to charge the one or more energy storage devices using voltage from the power distribution grid. The example method may include one or more of the following features, either alone or in combination.

The power electronics may include a bidirectional rectifier in an electrical pathway between at least part of the power distribution grid and the one or more energy storage devices. The control signal may be for controlling the bidirectional rectifier either to output the voltage from the one or more energy storage devices to the power distribution grid or to charge the one or more energy storage devices using the voltage from the power distribution grid. The information may be from a grid manager for controlling at least part of the power distribution grid other than the UPS.

The power electronics may include a bidirectional converter in an electrical pathway between at least part of the power distribution grid and the one or more energy storage devices. The control signal may be for controlling the bidirectional converter either to output the voltage from the one or more energy storage devices to the power distribution grid or to charge the one or more energy storage devices using the voltage from the power distribution grid. The information may be from a demand manager that is local to, and for controlling at least part of, the UPS.

The information that is based on a voltage on the power distribution grid may include a signal indicating that the voltage on the power distribution grid is below a target voltage. The example method may include determining the information that is based on the voltage on the power distribution grid by determining a difference between the voltage on the power distribution grid and a reference voltage.

Monitoring the state of charge of one or more energy storage devices may include determining whether the state of charge is below a predefined level. If the state of charge is below the predefined level, the control signal may indicate to charge the one or more energy storage devices using voltage from the power distribution grid.

Monitoring the state of charge of one or more energy storage devices may include determining whether the state of charge is at or above a predefined level. If the state of charge is at or above the predefined level and the information is based on the voltage on the power distribution grid being below a target voltage, the control signal may indicate to output the voltage from the one or more energy storage devices to the power distribution grid.

The information may be, or include, a command signal. Monitoring the state of charge of one or more energy storage devices may include determining whether the state of charge is at or above a predefined level. If the state of charge is at or above the predefined level and the command signal indicates to perform discharging, the control signal may indicate to output the voltage from the one or more energy storage devices to the power distribution grid.

The information may be, or include, a command signal. Monitoring the state of charge of one or more energy storage devices may include determining whether the state of charge is below a predefined level. I the state of charge is below the predefined level and the command signal indicates to perform charging, the control signal may indicate to charge the one or more energy storage devices using voltage from the power distribution grid.

The one or more energy storage devices may be, or include, one or more batteries. At least one of the one or more batteries may be lithium-based.

Any two or more of the features described in this specification, including in this summary section, can be combined to form implementations not specifically described in this specification.

The systems, techniques, and processes described in this specification, or portions of the systems, techniques, and processes, can be implemented as, controlled by, or both implemented as and controlled by, a computer program product that includes instructions that are stored on one or more non-transitory machine-readable storage media, and that are executable on one or more processing devices to control (e.g., coordinate) the operations described herein. The systems, techniques, and processes described in this specification, or portions of the systems, techniques, and processes, can be implemented as an apparatus, method, or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
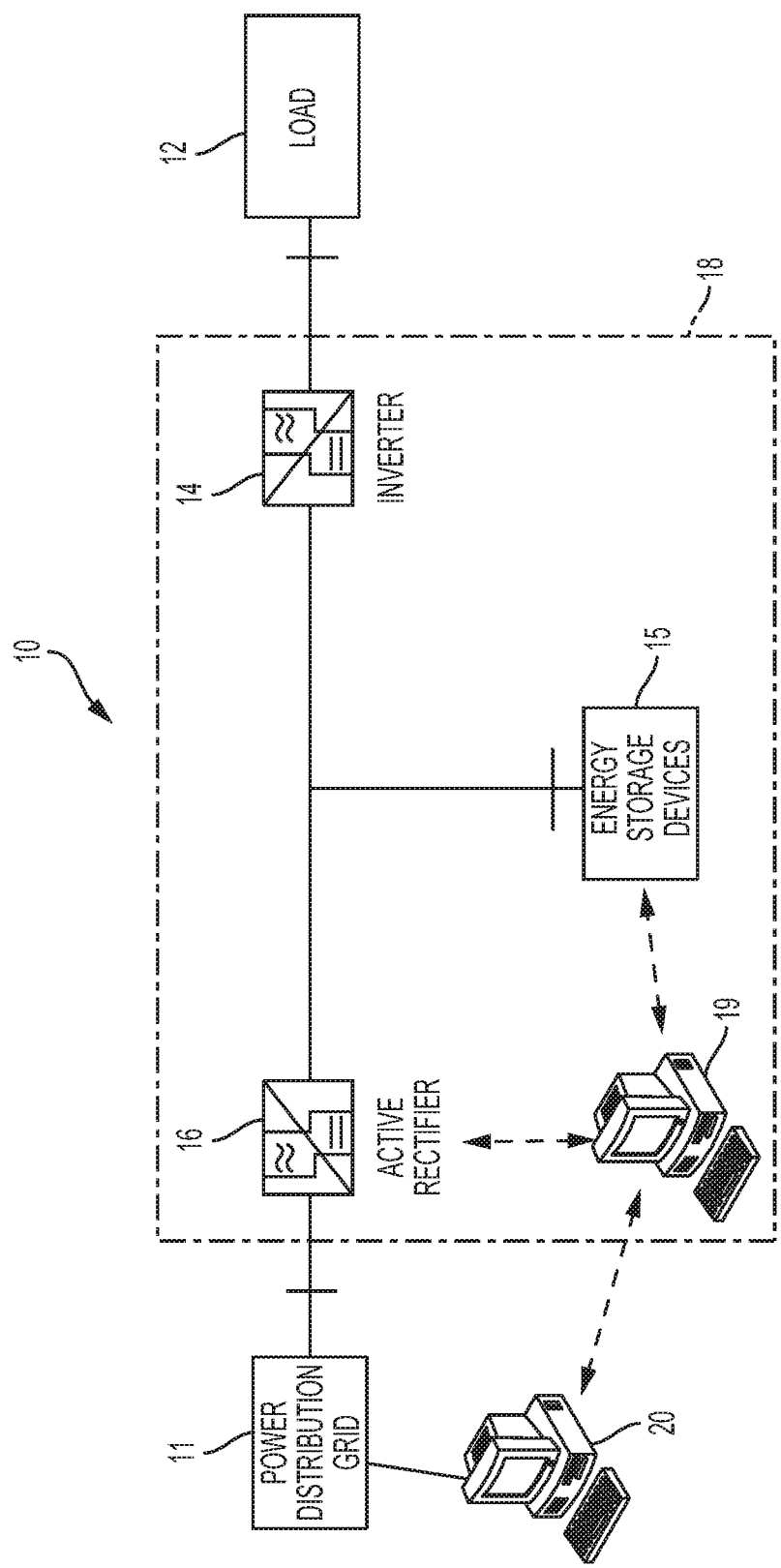
FIG. 1 is a block diagram of an example UPS system that is configurable to provide voltage to, and to receive voltage from, a power distribution grid.

Described in this specification are example power control systems ("the system") that are configurable to control power electronics either to provide voltage from an energy storage system to a power distribution grid, or to provide voltage from the power distribution grid to the energy storage system. For example, voltage may be provided from an uninterruptable power supply (UPS) to the power distribution grid, or from the power distribution grid to the UPS. In some implementations, the system monitors a state of charge (SOC) of energy storage devices in the UPS. The monitoring may be performed to ensure that the energy storage devices retain enough charge to power a local load. For example, if the SOC of the energy storage devices is below a predefined level, such as (but not limited to) 50%, the energy storage devices will not be used to provide voltage to the power distribution grid, since their voltage may be needed to power the load. In another example, if the SOC of the energy storage devices is at or above a predefined level, such as (but not limited to) 50%, the energy storage devices may be used to provide voltage to the power distribution grid, at least to the point where sufficient charge remains on the energy storage devices to power the load, if necessary. The system may be controlled, at least in part, using a computing system, including one or more processing devices, of a type described in this specification.

During operation, the system also receives information that is based, at least in part, on a voltage on the power distribution grid. In an example, the system may receive information based on the voltage on a local branch of the power distribution grid. The information may indicate that the voltage on the power distribution grid is below a target voltage. In this case, assuming that there is sufficient charge available for use in the UPS, the system may output a control signal indicating for power electronics, such as a bidirectional rectifier or converter, to output voltage from the UPS to the power distribution grid. The information output may indicate that the voltage on the power distribution grid is at, or above, the target voltage. In this case, assuming that the UPS is at less than a nominal charge, such as full (100%) charge, the system may output a control signal indicating for power electronics, such as the bidirectional rectifier or converter, to charge the UPS using voltage from the power distribution grid.

In power distribution grids, losses are mostly of real, or active, power and, therefore, cannot be compensated by reactive devices. For example, power may be lost as a result of heat dissipation in grid conductors. Real power, however, may be injected to offset losses such as these. Since UPS systems are tapped into a power network through the power distribution grid, UPS systems can be used, as described previously, to modulate a portion of their stored real power into the power distribution grid and thus compensate for voltage drops caused by power lost, for example, through heat dissipation. Given the wide geographic installation base of UPS systems, UPS batteries, for example, can be used to inject real power to compensate for the real power loss dissipated as heat at multiple points throughout the power distribution grid. The system can also provide reactive power compensation because the UPS front-end—the bidirectional rectifier or converter—can also be configured to control the amplitude and the phase of voltage output to the power distribution grid from the UPS. Furthermore, because the system takes into account the state of charge—the SOC—on energy storage devices in UPS systems, the system may be able to support the power distribution grid without impairing the primary function of the UPS systems.

Electric power is the product of voltage (V) and current (I). However, generally, power conversion includes converting electric energy from one form to another, such as between AC voltage and DC voltage. Accordingly, the example implementations are described in terms of voltage, which is a component of electric power.

FIG. 1 shows an implementation of an example power control system 10 of the type described previously. System 10 is connected, electrically, to a power distribution grid 11. Power distribution grid 11 distributes high-voltage alternating current (AC) power to geographically-distributed loads, such as load 12. UPS system 10 protects load 12 in the event of an interruption of power on the power distribution grid. In this example, UPS system 10 provides voltage to load 12 almost immediately in response to an interruption of power. The voltage is provided from one or more energy storage devices 15, examples of which include, but are not limited to, batteries, superconducting magnets, capacitors, flywheels, or other appropriate devices. Examples of loads, such as load 12, that may be protected by the UPS system include, but are not limited to, medical devices, computer systems, data centers, telecommunication equipment, or other electrically-powered devices. Failure of such devices caused by an unexpected power interruption may cause injury, death, data loss, or financial hardship.

UPS system 10 includes inverter 14. Inverter 14 is an example of power electronics that is configured to convert direct current (DC) voltage into AC voltage. In UPS system 10, inverter 14 is configured to generate AC voltage from DC voltage, and to provide the resulting AC voltage to load 12. Inverter 14 is configured to operate, at different times, on voltage provided by the power distribution grid or on voltage provided by energy storage devices 15. In an example, while the power distribution grid is operating normally—for instance, there is no interruption of power on the power distribution grid—DC voltage is received by inverter 14 from the power distribution grid via rectifier 16. During this normal operation, inverter 14 converts DC voltage from rectifier 16 into AC voltage, and outputs that AC voltage to power load 12. In an example, when the power distribution grid is not operating normally—for instance, there is an interruption of power on the power distribution grid—DC voltage is received by inverter 14 from energy storage devices 15. During this operation, inverter 14 converts DC voltage from energy storage devices 15 into AC voltage, and outputs that AC voltage to power load 12. Inverter 14 continues to power load 12 based on DC voltage from the energy storage devices until the power distribution grid resumes normal operation. After that, inverter 14 resumes powering load 12 based on DC voltage obtained from the power distribution grid through the operation of rectifier 16.

Inverter 14 may be implemented using active components comprised of solid state devices, such as one or more insulated-gate bipolar transistors (IGBTs), one or more metal-oxide-semiconductor field-effect transistors (MOSFETs), or both. These active components may be controlled by pulse width modulation (PWM) signals applied at their gates. These components and the PWM signals are configurable to control voltage amplitude, phase, and frequency at UPS output terminals.

As noted, rectifier 16 is an example of power electronics that may be configured to generate DC voltage from AC voltage received from the power distribution grid. Rectifier 16 is on an electrical pathway between the power distribution grid and both the inverter 14 and energy storage devices 15. A rectifier may be an active rectifier or a passive rectifier. In some implementations, an active rectifier is a rectifier that is bidirectional. For example, voltage can pass through the rectifier from the UPS to the power distribution grid or from the power distribution grid to the UPS. In some implementations, a passive rectifier is a rectifier that is unidirectional. For example, voltage can pass through the rectifier from the power distribution grid to the UPS, but not from the UPS to power distribution grid. System 10 of FIG. 1 employs an active rectifier. System 25 of FIG. 2 employs a passive rectifier.

In system 10 of FIG. 1, rectifier 16 constitutes, and includes the functionality of, a bidirectional converter. An example rectifier of this type may be implemented using multiple IGBTs configured in antiparallel with diodes. The rectifier allows voltage to flow back-and-forth between energy storages devices 15 in UPS 18 and power distribution grid 11. In an example, rectifier 16 is configured to receive AC voltage from the power distribution grid, to convert that AC voltage into DC voltage, and to provide that DC voltage to inverter 14, to energy storage devices 15, or to both inverter 14 and energy storage devices 15, as appropriate. In an example, rectifier 16 is also configured to receive DC voltage from energy storage devices 15, to convert that DC voltage into AC voltage, and to provide that AC voltage to the power distribution grid, as appropriate.

In example system 10, computing system 19 is configured to communicate with a grid manager 20. In this example, computing system 19 is local to, and part of, UPS 18; however, that need not be the case. Grid manager 20 is connected to, and communicates with, power distribution grid 11. Computing system 19 may be implemented using any appropriate processing or other devices described in this specification. Computing system 19 may be configured to execute one or more control modules which, among other things, are configured to monitor the SOC of the energy storage devices, and to determine how to control power flow. Grid manager 20 may be implemented using any appropriate processing or other devices described in this specification, and is configured to monitor, to control, or both to monitor and to control, the power distribution grid, and to communicate with UPS 18.

Grid manager 20 may be remote from UPS system 10. For example, grid manager 20 may be electrically connected to the power distribution grid in a geographic location that is different from the geographic location of UPS system 10. Grid manager 20 may be configured to output a command indicating that voltage from the UPS system is to be provided to the distribution grid, or that voltage from the power distribution grid is to be provided to the UPS system. The command may be based on a voltage detected on any appropriate part of the power distribution grid. The voltage detected may be indicative of power losses in the power distribution grid. For example, the voltage detected may be below a target voltage. The command may instruct the UPS system to output voltage to compensate for those power losses.

Figure 3:
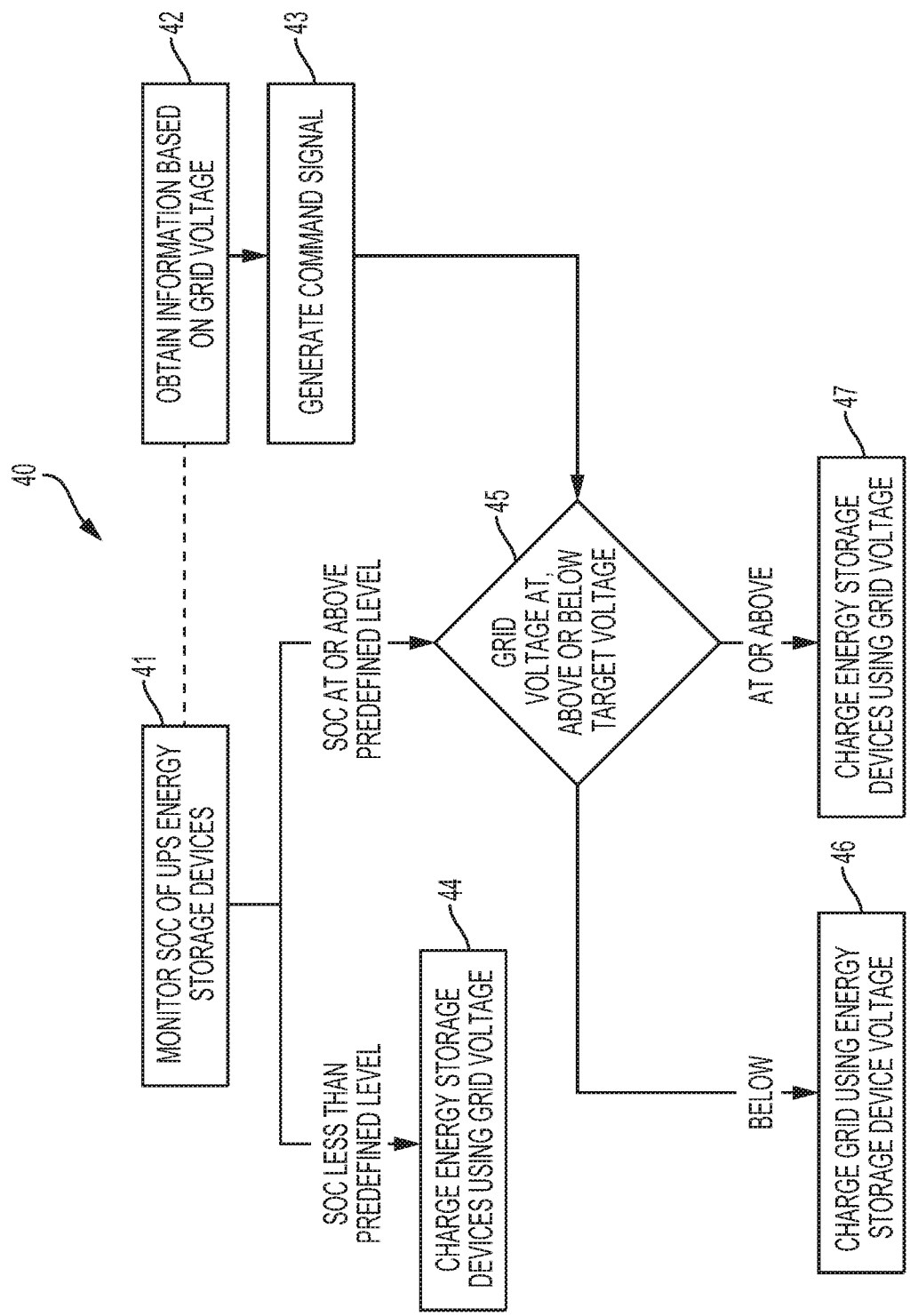
FIG. 3 is a flowchart showing operations that are executable to control the flow of power between a UPS system and a power distribution grid.

For example, as described in more detail with respect to FIG. 3, a control signal may be generated, and output, by computing system 19 based on the SOC of the energy storage devices, the voltage on any appropriate part of the power distribution grid, or both the SOC of the energy storage devices and the voltage on the power distribution grid. For example, the control signal may be based on the SOC of the energy storage devices, the voltage on a local branch of the power distribution grid, or both the SOC of the energy storage devices and the voltage on the local branch of the power distribution grid. In some implementations, a branch of the power distribution grid is local if that branch is within a predefined geographic area of the UPS system.

Figure 2:
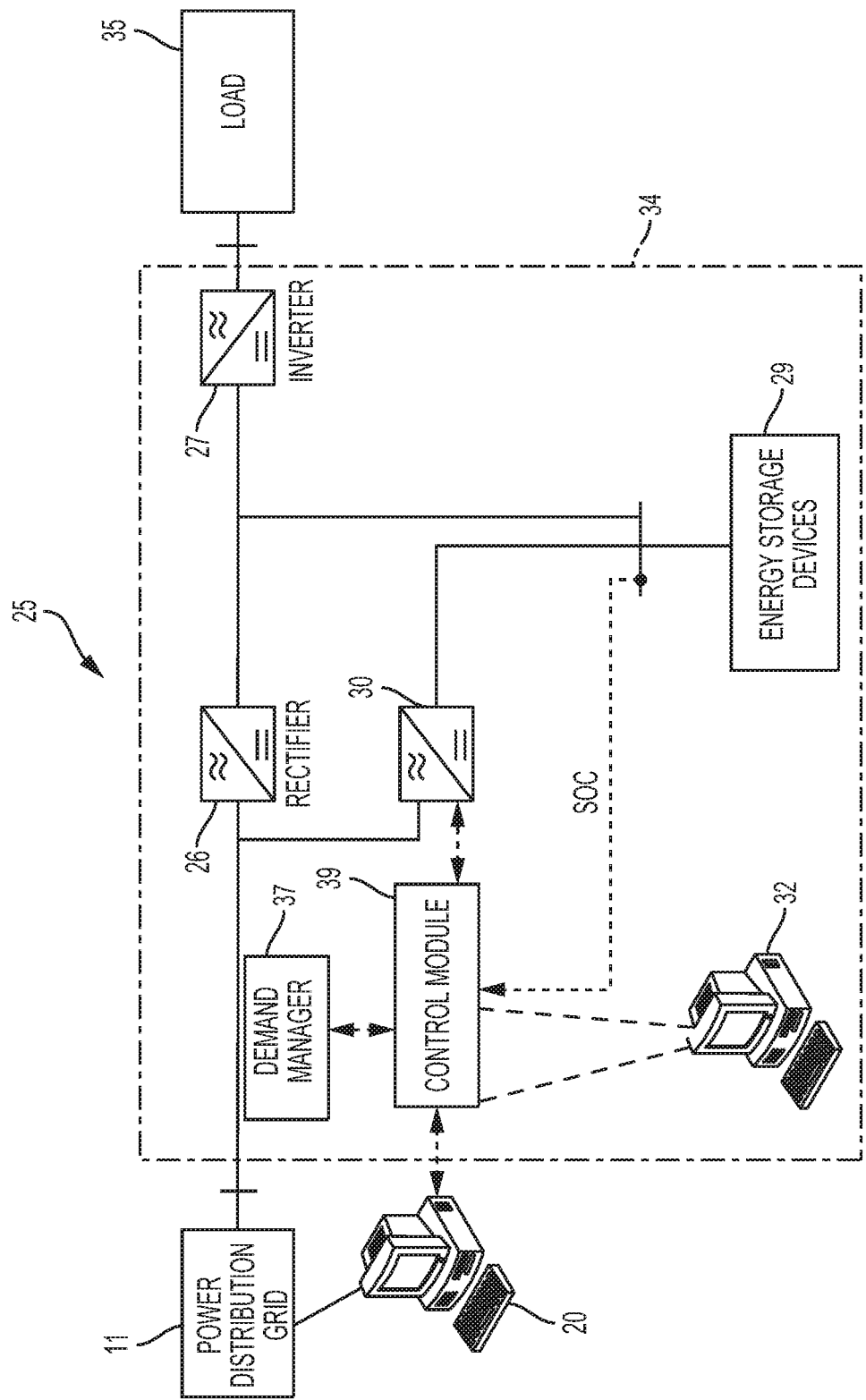
FIG. 2 is a block diagram of another example UPS system that is configurable to provide voltage to, and to receive voltage from, a power distribution grid.

Referring to FIG. 2, in system 25, rectifier 26 is a passive rectifier. For example, rectifier 26 is configured to receive AC voltage from the power distribution grid, to convert that AC voltage into DC voltage, and to provide that DC voltage to inverter 27, to energy storage devices 29, or to both, as appropriate. In this example, however, rectifier 26 is not configured to provide voltage back to the power distribution grid. Some legacy UPS systems include passive rectifiers of this type. Legacy UPS systems may therefore be retrofitted with one or more bidirectional converters, as shown in FIG. 2, to enable providing voltage to the power distribution grid. Bidirectional converter 30 includes power electronics that is in an electrical pathway between power distribution grid 11 and UPS energy storage devices 29. Bidirectional converter 30 is configured to allow voltage from the power distribution grid to charge the energy storage devices, or to allow voltage from the energy storages devices to charge the power distribution grid.

An example bidirectional converter 30 may be implemented using multiple IGBTs configured in antiparallel with diodes. Bidirectional converter 30 allows power to flow back-and-forth between UPS energy storage devices 29 and power distribution grid 11. In an example, bidirectional converter 30 is configured to receive AC voltage from the power distribution grid, to convert that AC voltage into DC voltage, and to provide that DC voltage to energy storage devices 29, as appropriate. In an example, bidirectional converter 30 is also configured to receive DC voltage from energy storage devices, to convert that DC voltage into AC voltage, and to provide that AC voltage to the power distribution grid, as appropriate. In this example, bidirectional converter does not service inverter 27. Rather, inverter 27 receives DC voltage from rectifier 26 during normal operation, and from energy storage devices 29 during power interruptions. Inverter 27, as before, generates appropriate AC voltage to apply to load 35.

In example system 25, computing system 32 is part of UPS system 34, and is configured to communicate with a demand manager 37. In some implementations, computing system 32 may be external to UPS system 34. Computing system 32 may be implemented using any appropriate processing or other devices described in this specification. Computing system 32 may be configured to execute one or more control modules 39 which, among other things, are configured to monitor the SOC of energy storage devices 29, and to determine how to control power flow. Demand manager 37 may be implemented using any appropriate processing or other devices described in this specification. In some implementations, demand manager may be implemented on computing system 32. In some implementations, demand manger 37 is executed on a different computing system than computing system 32. In some implementations, a grid manager, such as the grid manager 20 described with respect to FIG. 1, may function as the demand manager.

Demand manager 37 may be local to UPS system 34, as shown. For example, demand manager 37 may be part of UPS system 34. Control module 39 may be configured to control bidirectional converter 30 based on a command or control signal received from demand manager 37. The control signal may control the bidirectional converter to output voltage from one or more of energy storage devices 29 to power distribution grid 11, or to charge one or more energy storage devices 29 using voltage from power distribution grid 11. As described in more detail with respect to FIG. 1, the control signal may be generated, and output, by computing system 32 based on the SOC of the energy storage devices, the voltage on any appropriate part of the power distribution grid, or both the SOC of the energy storage devices and the voltage on the power distribution grid. For example, the control signal may be based on the SOC of the energy storage devices, the voltage on a local branch of the power distribution grid, or both the SOC of the energy storage devices and the voltage on the local branch of the power distribution grid. The effect of the voltage on the power distribution network may be taken into account using charge or discharge commands.

In some implementations, the example control system includes a charge/discharge module configured to monitor the SOC of batteries in the UPS, and to send a signal to a grid-side converter to indicate where the power should flow: from grid to batteries or from batteries to grid. The charge/discharge module may be implemented on a computing system. Based on the battery technology that is being used, an operating range can be reserved for the grid application and another range can be reserved for UPS functionalities. As an example, some lithium-based batteries can safely operate down to 20% of their SOC. In an example, the batteries are allowed to be used to charge the grid only when their SOC is 50% or more. This way, there is always at least 30% capacity available for UPS functionalities. In an example, the control process monitors the SOC of the batteries constantly in order to respond accordingly to requests from the grid manager or the demand manager. These operations can be summarized as follows: read the SOC of the batteries; read a command signal from the demand manager or the grid manager; if the command signal for charging is set to one and the SOC is less than 100%, then the converter is controlled to charge the batteries; and if the command signal for discharging is set to one and the SOC is more than 50%, then the converter is controlled to provide power back to the power distribution grid. These operations may be repeated continuously in a real-time loop. In this regard, in some implementations, real-time may include actions that occur on a continuous basis or track each other in time, taking into account delays associated with processing, data transmission, hardware, and the like.

In some implementations, the systems described in this specification may benefit from high cycling and high charging and discharging rates provided by lithium ion or lithium titanate batteries. In some cases, these types of batteries also provide safe operation down to 20% of their SOC. So, in an example, 50% of the operating range may be used for grid applications and 30% may be used for emergency power for the load. The example systems, however, are not limited to use with lithium-based batteries. In some implementations, a bidirectional rectifier is configured to allow the batteries to discharge into the power distribution grid when needed and within specific SOC preset limits. The control module decides when to charge the batteries and when to use stored power for power loss compensation in the power distribution grid.

FIG. 3 is a flowchart showing an example process 40 that is executable to control the flow of power between a power distribution grid and a UPS system, such as UPS system 18 of FIG. 1 or UPS system 34 of FIG. 1. Process 40, however, is not limited to use with the UPS systems described in this specification or to use with UPS systems in general. Process 40 may be used with any appropriate energy storage system.

Process 40 includes monitoring (41) an SOC of one or more energy storage devices in a UPS system that is electrically connected to a power distribution grid. The monitoring may be performed using a computing system, such as computing system 19 (FIG. 1) or 32 (FIG. 2), that implements a control module having charge-discharge functionality. In an example, monitoring the SOC may include determining whether the state of charge is below a predefined level. In an example, monitoring the SOC may include determining whether the state of charge is at or above a predefined level. For example, in some implementations, the monitoring may include determining whether the SOC of batteries in a UPS system are at or below 50%. However, process 40 is not limited to use with a 50% value; any appropriate value may be used.

Process 40 obtains (42) information that is based, at least in part, on a voltage on the power distribution grid. For example, the information may include a signal having a value, such as one or zero, that is based on the voltage on the power distribution grid being above or below a predefined voltage. In this regard, the information may be determined by taking a difference between the voltage on the power distribution grid and a target voltage for the power distribution grid. The difference obtained may be between the reference voltage and any appropriate voltage on the power distribution grid, such as a voltage on a branch of the power distribution grid that is local to the UPS. If the difference is zero or less than zero, then the voltage on the power distribution grid is at or above the target voltage. If the difference is greater than zero, the voltage on the power distribution grid is below the target voltage. In some implementations, the processing performed to obtain the difference may be performed by a grid manager that is remote from or local to a UPS, by a demand manager that is part of the UPS, or by any other appropriate entity. For example, the processing performed to obtain the difference may be performed by a computing system, such as computing system 19 (FIG. 1) or 32 (FIG. 2). Voltage information from the power distribution grid may be obtained from any appropriate source, such as a grid manager.

In some implementations, the information obtained includes a command signal that is generated based on whether the voltage on the power distribution grid is above or below the target voltage. In an example, if the voltage on the power distribution grid is at or above the target voltage, there may be no need to charge the power distribution grid from the energy storage devices in the UPS. In this example, a command signal may be generated (43) indicating to charge the energy storage devices in the UPS. In an example, if the voltage on the power distribution grid is below the target voltage, there may be a need to charge the power distribution grid from the energy storage devices in the UPS. In this example, a command signal may be generated indicating to discharge the energy storage devices. In this context, discharging includes outputting voltage from the energy storage devices to the power distribution grid.

Process 40 includes generating and outputting a control signal that is based on the SOC of the energy storage devices and information obtained, such as the command signal. The control signal instructs power electronics, such as a bidirectional rectifier or a bidirectional converter, either to output voltage from UPS energy storage devices to the power distribution grid or to charge the UPS energy storage devices using voltage from the power distribution grid. In this regard, in an example, if the SOC of the UPS energy storage device is below (44) a predefined level, such as 50%, then the UPS energy storage device is not operable to output voltage to the power distribution grid. In this circumstance, the control signal indicates to charge the UPS energy storage devices using voltage from the power distribution grid. Accordingly, the control signal controls bidirectional rectifier 16 or bidirectional converter 30 to charge the UPS energy storage devices using voltage from the power distribution grid.

If the SOC of the UPS energy storage device is at or above a predefined level, such as 50%, then bidirectional rectifier 16 or bidirectional converter 30 is also controlled based on whether the voltage on the power distribution grid is above or below a target voltage. Two examples of possible control scenarios are as follows In an example, if the SOC of the UPS energy storages devices is at or above the predefined level and the voltage on the power distribution grid is below (45) a target voltage, the control signal instructs to output voltage from the UPS energy storage devices to the power distribution grid. In some implementations, a command signal may be received from a grid manager or a demand manager indicating to perform discharging. In some implementations, the command signal may be generated on a computing system local to the UPS, such as computing system 19 or 32, based on information, such as voltage readings, provided by the grid manager, demand manager, or other entity. A command signal of this type is indicative of the voltage on the power distribution grid being below the target voltage. Accordingly, the control signal is applied to control bidirectional rectifier 16 or bidirectional converter 30 to charge (46) the power distribution grid from the UPS energy storage devices. In some implementations, the UPS energy storage devices are monitored continually, periodically, sporadically, or at any appropriate intervals. If the voltage in the UPS energy storage devices becomes near or below the predefined level, charging of the power distribution grid ceases.

In an example, if the SOC of the UPS energy storages devices is at or above the predefined level and the voltage on the power distribution grid is at or above the target voltage (45), the control signal instructs to output voltage from the power distribution grid to the UPS energy storage device. In some implementations, a command signal may be received from a grid manager or a demand manager indicating to perform charging. A command signal of this type is indicative of the voltage on the power distribution grid being at or above the target voltage. Accordingly, the control signal controls bidirectional rectifier 16 or bidirectional converter 30 to charge (47) the UPS energy storage devices using the voltage from the power distribution grid. Charging may occur until the UPS energy storage devices are fully charged, for example, 100% charged. In some implementations, bidirectional rectifier 16 or bidirectional converter 30 are not reconfigured to charge the power distribution grid from the UPS energy storage devices at least until a discharge command is received.

A UPS usable with the systems and processes described in this specification may include one energy storage device, or multiple energy storage devices. The energy storage devices may be located at an appropriate location relative to the load.

All or part of the processes described in this specification and their various modifications (referred to as "the processes") can be implemented or controlled, at least in part, via a computer program product, such as a computer program tangibly embodied in one or more information carriers, such as in one or more tangible machine-readable storage media, for execution by, or to control the operation of, data processing apparatus, such as a programmable processor, a computer, or multiple computers A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed or controlled by one or more programmable processors executing one or more computer programs to perform the functions of the calibration process. All or part of the processes can be implemented as, special purpose logic circuitry, for example an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, for example magnetic, magneto-optical disks, or optical disks. Non-transitory machine-readable storage media suitable for embodying computer program instructions and data include all forms of non-volatile storage area, including by way of example, semiconductor storage area devices such as EPROM, EEPROM, and flash storage area devices; magnetic disks such as internal hard disks or removable disks; magneto-optical disks; and CD-ROM and DVD-ROM disks.

Each computing device, such as server, may include a hard drive for storing data and computer programs, and a processing device (for example, a microprocessor) and memory (for example, RAM) for executing computer programs.

Elements of different implementations described in this specification may be combined to form other implementations not specifically set forth above. Elements may be left out of the processes, computer programs, interfaces, and the like described in this specification without adversely affecting their operation or the operation of the system in general. Furthermore, various separate elements may be combined into one or more individual elements to perform the functions described in this specification.

Any "electrical connection" as used in this specification may imply, as appropriate, a direct physical connection or a wired or wireless connection that includes or does not include intervening components but that nevertheless allows electrical signals to flow between connected components. Any "connection" involving electrical circuitry that allows signals to flow, unless stated otherwise, is an electrical connection and not necessarily a direct physical connection regardless of whether the word "electrical" is used to modify "connection".

Other implementations not specifically described in this specification are also within the scope of the following claims.

What is claimed is:

1. A method comprising:
monitoring a state of charge of one or more energy storage devices that are part of an uninterruptable power supply (UPS), the UPS being connected electrically to a power distribution grid;
obtaining information that is based on a voltage on the power distribution grid, determining the information that is based on the voltage on the power distribution grid by determining a difference between the voltage on the power distribution grid and a reference voltage; and
outputting a control signal that is based on the state of charge and the information, the control signal for controlling power electronics either to output voltage from the one or more energy storage devices to the power distribution grid or to charge the one or more energy storage devices using voltage from the power distribution grid.

2. The method of claim 1, where the power electronics comprises a bidirectional rectifier in an electrical pathway between at least part of the power distribution grid and the one or more energy storage devices; and
where the control signal is for controlling the bidirectional rectifier either to output the voltage from the one or more energy storage devices to the power distribution grid or to charge the one or more energy storage devices using the voltage from the power distribution grid, the information being from a grid manager for controlling at least part of the power distribution grid other than the UPS.

3. The method of claim 1, where the power electronics comprises a bidirectional converter in an electrical pathway between at least part of the power distribution grid and the one or more energy storage devices; and
where the control signal is for controlling the bidirectional converter either to output the voltage from the one or more energy storage devices to the power distribution grid or to charge the one or more energy storage devices using the voltage from the power distribution grid, the information being from a demand manager that is local to, and for controlling at least part of, the UPS.

4. The method of claim 1, where the information that is based on a voltage on the power distribution grid comprises a signal indicating that the voltage on the power distribution grid is below a target voltage.

5. The method of claim 1, where monitoring the state of charge of one or more energy storage devices comprises determining whether the state of charge is below a predefined level; and
where, if the state of charge is below the predefined level, the control signal indicates to charge the one or more energy storage devices using voltage from the power distribution grid.

6. The method of claim 1, where monitoring the state of charge of one or more energy storage devices comprises determining whether the state of charge is at or above a predefined level; and
where, if the state of charge is at or above the predefined level and the information is based on the voltage on the power distribution grid being below a target voltage, the control signal indicates to output the voltage from the one or more energy storage devices to the power distribution grid.

7. The method of claim 1, where the information comprises a command signal;
where monitoring the state of charge of one or more energy storage devices comprises determining whether the state of charge is at or above a predefined level; and
where, if the state of charge is at or above the predefined level and the command signal indicates to perform discharging, the control signal indicates to output the voltage from the one or more energy storage devices to the power distribution grid.

8. The method of claim 1, where the information comprises a command signal;
where monitoring the state of charge of one or more energy storage devices comprises determining whether the state of charge is below a predefined level; and
where, if the state of charge is below the predefined level and the command signal indicates to perform charging, the control signal indicates to charge the one or more energy storage devices using voltage from the power distribution grid.

9. The method of claim 1, where the one or more energy storage devices comprises one or more batteries, at least one of the one or more batteries being lithium-based.

10. A system comprising:
memory storing instructions that are executable; and
one or more processing devices to execute the instructions to perform operations comprising:
monitoring a state of charge of one or more energy storage devices that are part of an uninterruptable power supply (UPS), the UPS being connected electrically to a power distribution grid;
obtaining information that is based on a voltage on the power distribution grid, determining the information that is based on the voltage on the power distribution grid by determining a difference between the voltage on the power distribution grid and a reference voltage; and
outputting a control signal that is based on the state of charge and the information, the control signal for controlling power electronics either to output voltage from the one or more energy storage devices to the power distribution grid or to charge the one or more energy storage devices using voltage from the power distribution grid.

11. The system of claim 10, where the power electronics comprises a bidirectional rectifier in an electrical pathway between at least part of the power distribution grid and the one or more energy storage devices; and
where the control signal is for controlling the bidirectional rectifier either to output the voltage from the one or more energy storage devices to the power distribution grid or to charge the one or more energy storage devices using the voltage from the power distribution grid, the information being from a grid manager for controlling at least part of the power distribution grid other than the UPS.

12. The system of claim 10, where the power electronics comprises a bidirectional converter in an electrical pathway between at least part of the power distribution grid and the one or more energy storage devices; and
where the control signal is for controlling the bidirectional converter either to output the voltage from the one or more energy storage devices to the power distribution grid or to charge the one or more energy storage devices using the voltage from the power distribution grid, the information being from a demand manager that is local to, and for controlling at least part of, the UPS.

13. The system of claim 10, where the information that is based on a voltage on the power distribution grid comprises a signal indicating that the voltage on the power distribution grid is below a target voltage.

14. The system of claim 10, where monitoring the state of charge of one or more energy storage devices comprises determining whether the state of charge is below a predefined level; and
where, if the state of charge is below the predefined level, the control signal indicates to charge the one or more energy storage devices using voltage from the power distribution grid.

15. The system of claim 10, where monitoring the state of charge of one or more energy storage devices comprises determining whether the state of charge is at or above a predefined level; and
where, if the state of charge is at or above the predefined level and the information is based on the voltage on the power distribution grid being below a target voltage, the control signal indicates to output the voltage from the one or more energy storage devices to the power distribution grid.

16. The system of claim 10, where the information comprises a command signal;
where monitoring the state of charge of one or more energy storage devices comprises determining whether the state of charge is at or above a predefined level; and
where, if the state of charge is at or above the predefined level and the command signal indicates to perform discharging, the control signal indicates to output the voltage from the one or more energy storage devices to the power distribution grid.

17. The system of claim 10, where the information comprises a command signal;
where monitoring the state of charge of one or more energy storage devices comprises determining whether the state of charge is below a predefined level; and
where, if the state of charge is below the predefined level and the command signal indicates to perform charging, the control signal indicates to charge the one or more energy storage devices using voltage from the power distribution grid.

18. The system of claim 10, where the one or more energy storage devices comprises one or more batteries, at least one of the one or more batteries being lithium-based.

19. One or more non-transitory machine-readable storage media storing instructions that are executable by one or more processing devices to perform operations comprising:
monitoring a state of charge of one or more energy storage devices that are part of an uninterruptable power supply (UPS), the UPS being connected electrically to a power distribution grid;
obtaining information that is based on a voltage on the power distribution grid, determining the information that is based on the voltage on the power distribution grid by determining a difference between the voltage on the power distribution grid and a reference voltage; and
outputting a control signal that is based on the state of charge and the information, the control signal for controlling power electronics either to output voltage from the one or more energy storage devices to the power distribution grid or to charge the one or more energy storage devices using voltage from the power distribution grid.

* * * * *